July 7, 1959        V. W. BOLIE        2,893,138
OPTICAL ANALOGUE OF A RADIO SCATTERING ATMOSPHERE
Filed Sept. 5, 1957
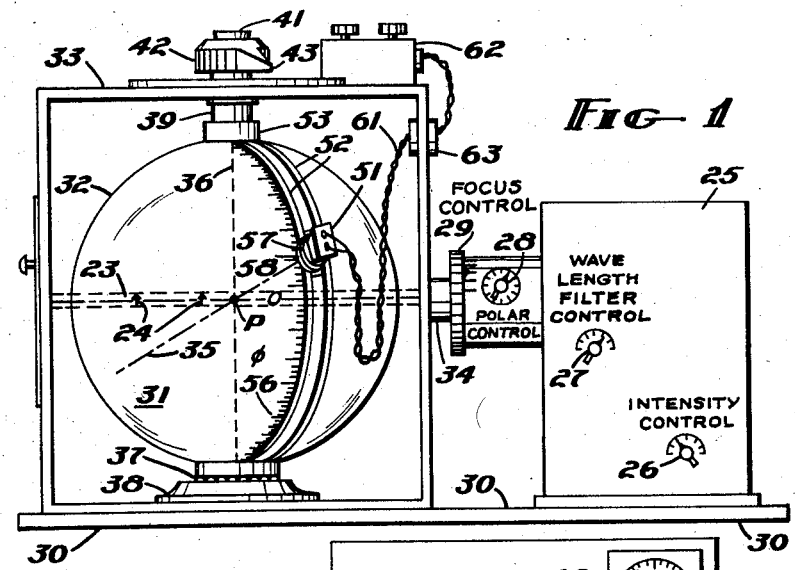
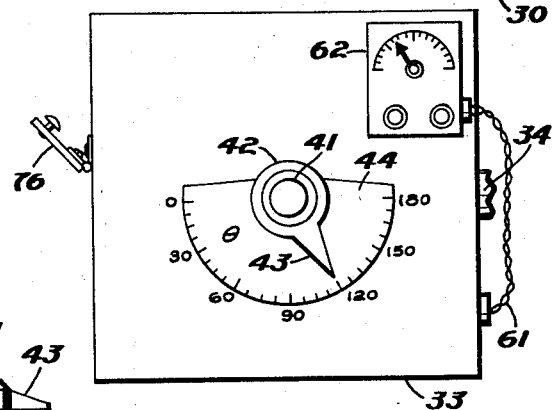
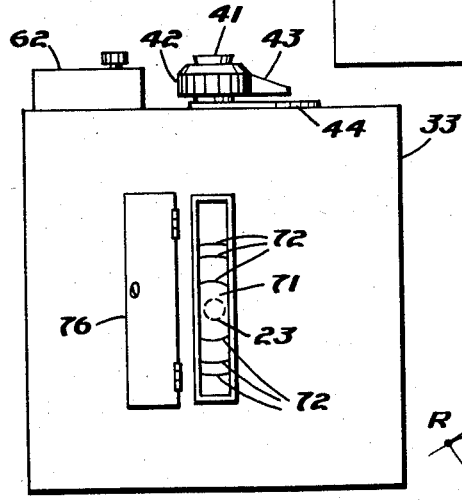
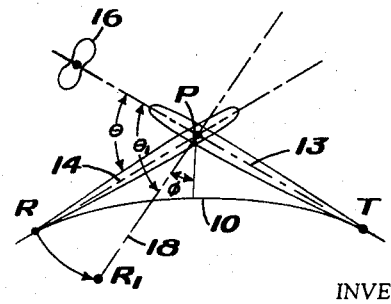
INVENTOR.
VICTOR W. BOLIE
BY *Moody and Goldman*
ATTORNEYS

United States Patent Office 2,893,138
Patented July 7, 1959

2,893,138

OPTICAL ANALOGUE OF A RADIO SCATTERING ATMOSPHERE

Victor W. Bolie, Cedar Rapids, Iowa, assignor to Collins Radio Company, Cedar Rapids, Iowa, a corporation of Iowa Application September 5, 1957, Serial No. 682,171

4 Claims. (Cl. 35—19)

This invention relates generally to means for measuring the scattering of radiation and simulates the scattering phenomenon occurring in the atmosphere of microwave radio frequencies due to the small perturbations in the refractive index of the atmosphere, which includes the ionosphere and troposphere.

A sufficient theory is not presently known which thoroughly explains the phenomenon of atmospheric radio scattering. Various theories have been advanced to explain the phenomenon, but none have, as yet, been able to explain much of the experimental data obtained thus far.

The radio scattering phenomenon permits the use of ultra-high-frequency radio waves to communicate between points separated by the shadow of the curvature of the earth. Previously, such frequency waves had been thought only capable of providing line-of-sight communications; but the recent discovery of the scattering phenomenon has permitted a many fold increase in distance between the communicating points using these frequencies.

The radio scattering phenomenon has been shown by experimental evidence to be due to the variation in the refractive index of the atmosphere caused by temperature and humidity variations of it. It has been found experimentally that the refractive index variations occur in a random manner in the atmosphere, wherein the fluctuations may be represented by "blobs" of atmosphere in which each "blob" has its own variation of refractive index. The "blobs" occur as isolated units in the atmosphere and generally move at relatively slow rates. They have been found to have a mean diameter of roughly 48 meters. The refractive index variation per "blob" is very small and at times is only a few parts per million.

The simulation of the scattering of radio beams in the atmosphere is done in the invention by the scattering of light beams in a particular type of mixture or suspension of particles in liquid, wherein only a slight difference in refractive index exists between the particles and the liquid. The particles representing the "blobs" are transparent and minute. They may be solid, such as of glass, and are supported in a liquid medium having a refractive index differing slightly from that of the particles. Also, the particles may be fluid, such as obtained by globules of an immiscible liquid colloidally suspended in a dispersion medium, or an emulsion.

The refractive index of the fluid medium is adjusted to differ from the refractive index of the particles by an amount that is within the range of $10^{-3}$ to $10^{-6}$ of the refractive index of said particles. Thus, the word, particles, is defined herein as small parts of solid material or immiscible liquid which is at least partially transparent to a given beam of directed radiation.

Although the boundary between the particles and the supporting fluid provides a sharp discontinuity in refractive index at the surface of each particle, it can be shown by comparing the well-known Rayleigh theory with a Gaussian theory that I have developed, that the media with spherical sharp discontinuity "blobs" have very nearly the same characteristics as a medium having "blobs" of smoothly varying refractive indices, where the refractive index variation is small and the refracting "blobs" are small. A mathematical analysis of the Gaussian "blob" and a comparison of it with the Rayleigh "blob" is given in a publication titled "Electromagnetic Propogation in an Almost Homogeneous Medium" written by me.

It can be shown mathematically that when the radius of a homogeneous sphere is equal to the anomaly radius of a nearly transparent Gaussian refractive inhomogeneity, the scattering effect of the spherical "blob" is related to the Gaussian "blob" by a constant which is 1.18, wherein the Gaussian "blob" provides 1.18 more scattered energy than the spherical homogeneous "blob."

Further objects, features and advantages of the invention will become apparent to a person skilled in the art upon further study of the specification and accompanying drawings, in which:

Figure 1 illustrates a form of the invention;

Figure 2 shows a partial top view of the embodiment in Figure 1;

Figure 3 illustrates an end view of the embodiment in Figure 1; and

Figure 4 shows a diagrammatic illustration of transmitting and receiving antenna beams communicating by means of scattered radio-frequency energy.

Now referring to the drawings for a more detailed explanation of a form of the invention, Figure 4 illustrates a manner of communication by means of scattered radio-frequency energy. A portion of the earth is represented by curve 10 and communication is sought between a transmitting point T and a receiving point R. Points T and R are separated by the shadow of curvature 10 of the earth, and accordingly straight-line propagation between points T and R is impossible. However, the scatter propagation phenomenon permits the sending from point T of a transmitting radiation beam 13 in the direction of the horizon toward receiving point R. Similarly, a receiving antenna at point R provides a receiving beam 14 pointed toward the horizon which intersects transmitted beam 13 in the troposphere at point P at an angle $\theta$. The geometry of the situation makes the distance TP equal to RP. Both beams are made as directive as possible (that is, they are nearly collimated beams), and they are preferably horizontally polarized. The intensity of the scattered energy at points distant from the beam, where the points are in a plane normal to the beam, is represented by a figure-eight type pattern 16. This intensity distribution is determined by the plane of polarization; and the direction of maximum intensity is in a plane normal to the polarization and passing through the axis of the beam. Hence, with horizontal polarization, the polarization is normal to the plane of the diagram of Figure 4; and the maximum intensity of scattered radio-frequency energy is in the plane of the diagram. It is noted that points T and R are located in the direction of maximum energy of the figure-eight downward portions. Furthermore, the intensity of the scattered energy increases as angle $\theta$ becomes smaller and reaches a maximum when angle $\theta$ is zero, where the receiving point would be aligned with the axis of the transmitting beam.

In Figure 4, the points TPR lie in a "great-circle" plane through the earth. However, scatter communication is also possible if these points do not lie in a "great-circle" plane. Thus, if point R is moved in a circular route about point P to a point $R_1$, the receiving beam is along line 18. It intersects beam 13 at point P. It will be noted that the angle $\theta$ is greater between beams 13 and 18 than between beams 13 and 14. It has been found experimentally that the scatter phenomenon increases in efficiency as the angle $\theta$ becomes smaller. Hence, more efficient scatter communication is found when TPR lie on a "great-circle" plane, although some experimental exceptions have been found.

The scatter communication link between points $TPR_1$ does not lie in a "great-circle" plane of the earth; and beam 18 makes a shortest angle $\phi$ with the "great-circle" plane TPR. If $\phi$ is small, point $R_1$ will still be separated by the shadow of the earth from point T.

In practice, antennas T and R are large and not very mobile, and the transmitted power is high. Thus, experiments in scatter communications are expensive and difficult. The present invention utilizes a very analogous phenomenon to provide a means for studying the radio scatter phenomenon that is relatively small in size, inexpensive to construct, and very flexible in controllably varying its parameters.

The simulated system of Figure 1 provides a light beam 23 which is analogous to transmitting beam 13 in Figure 4. Beam 23 is generally adjusted to be collimated and to be plane-polarized in the direction of arrows 24, which is analogous to the horizontal polarization of beam 13 in Figure 4 (in spite of the vertical appearance of arrows 24, as will be seen later). Such polarization provides a cross-sectional figure-eight type intensity pattern for the light beam similar to the cross-sectional pattern 16 in Figure 4. With polarization in the direction of arrows 24, the maximum intensity of the beam lies in a plane normal to the plane of arrows 24, and such normal plane (not shown) is parallel to base member 30 supporting the apparatus of Figure 1. Light beam 23 is generated by a light source 25 in the well-known manner of generating light rays. Source 25 has an intensity control 26 which, for example, regulates the voltage to the light source.

A wavelength filter control 27 is also provided in order to choose the wavelength (color) of light beam 23. The wavelength filter, for example, might be comprised of a triangular prism providing wavelength separation and a slot, wherein knob 27 provides a tilting control of the prism to pass a particular wavelength portion of the wavelength through the slot to provide beam 23. A focus control 29 permits beam 23 to be collimated or not, as desired. A polarization control 28 provides an adjustment for the plane of polarization by means of a rotatable polarization filter. One setting of knob 28 provides the polarization plane given by arrows 24 in Figure 1. Rotation of knob 28 can rotate arrows 24 through 360° in planes normal to beam 23.

Beam 23 is passed through a refractive medium 31 contained in a spherical bottle 32 made of optical glass. Bottle 32 is supported rotatably about axis 36 inside of an enclosed box 33, which has its front cover (not shown) removed in Figure 1. The entire internal surface of box 33 is painted with a dull black finish so that it absorbs all light energy received by it and therefore does not provide reflections which could interfere with the experiment. Light beam 23 is injected through a small opening in box 33 which is connected to light source 25 by means of a neck member 34 which keeps out stray radiation.

The bottom portion of bottle 32 is supported rotatable by ball bearings 37 on a pedestal 38 fastened to box 33. The neck 39 of the bottle extends upwardly through an opening in the box. The surface of neck 39 is painted a dull black color to prevent any light transmission through the neck portion into bottle 32 on box 33; and a light-proof seal is provided about the neck opening in the box. A bottle stopper member 41 having its surface painted a dull black color seals the upper opening of the bottle. Stopper 41 can be removed to change, alter the proportions, or agitate the fluid. Hence, a stirring rod or agitation motor can be provided through the neck of the bottle to mix the fluid contents of the bottle.

A handle 42 is cemented to the outwardly extended portion of bottle neck 39. Handle 42 has a pointer 43, best shown in Figure 2, which co-operates with a dial plate 44 fastened to box 33 to indicate the angular position $\theta$ of a radiation receiving member 51 (to be described later) with respect to light beam 23. Dial plate 44 is calibrated from 0° to 180°; although, of course, it could be calibrated through a full revolution of 0° through 360°. However, due to the symmetry of most beams, the illustrated calibration is generally sufficient.

A photoelectric cell 51 is supported on the exterior side of spherical bottle 32 and is set at a fixed position relative to bottle 32 and rotates with it. Photoelectric cell 51 acts as a receiver of the scattered light energy and has a lens system 57 fixed to it that provides a very high directivity in its operation. Cell 51 is supported on a double track 52 vertically fastened along the side of bottle 32. One end of track 52 is fastened to a collar 53 cemented to neck 39. The other end of track 52 is fastened to the upper race of bearing 37 which is fixed to the under-surface of bottle 32.

Photoelectric cell 51 is movable throughout the length of track 52. However, the center line 35 of directivity of cell 51 is always pointed to the center P of the spherical bottle, and accordingly always intersects the center line of the light beam 23 at point P. A calibration 56 is provided along track 52 to indicate the angular position $\phi$ of cell 51. The calibration is provided with a zero point at the equator of the sphere and approaches 90° near the poles.

An additional polarizing lens 58 is provided adjacent to directivity lens 57, in order to have polarization control at receiving cell 51. Generally, the polarization direction for cell 51 is preferably the same as the polarization direction of beam 23 for maximum reception, but experimentally they can be oriented in any manner.

A refractive medium 31 is provided in bottle 32 which is comprised of small particles supported in a fluid medium having very nearly the same refractive index.

Since the refractive index of the particles is generally fixed by the choice of the material of the particles, it is essential to have control of the refractive index of the supporting fluid medium. Such control is best obtained by choosing a medium comprised of a solution of two miscible fluids having different refractive indices, wherein the resultant refractive index of the fluid medium is dependent upon their proportions. When the supporting fluid solution is made of two component fluids, one has a refractive index below that of the selected particles, and the other has a refractive index above that of the particles. Refractive indices of many fluids are well known and may be found in literature such as "Handbook of Chemistry and Physics" by the Chemical Rubber Publishing Company. Refractive indices for many types of immiscible fluids which can be used as particles in the invention are given on pages 1242 and 1243 of this handbook.

The following table illustrates important physical characteristics of commercially available powdered glasses, any of which might be used as the refractive particles with the invention:

*Physical characteristics of Corning glasses*

| Type | Density, gm./cc. | Refractive Index |
|---|---|---|
| High Lead | 4.28 | 1.693 |
| Potash Soda Lead | 3.05 | 1.560 |
| Do | 2.89 | 1.545 |
| Do | 2.85 | 1.539 |
| Hard Lime | 2.53 | 1.534 |
| Soda Lime | 2.47 | 1.512 |
| Borosilicate | 2.43 | 1.506 |
| Soda Lime | 2.40 | 1.496 |
| Borosilicate | 2.35 | 1.487 |
| Do | 2.28 | 1.484 |
| Do | 2.25 | 1.479 |
| Do | 2.26 | 1.478 |
| Do | 2.24 | 1.475 |
| Do | 2.23 | 1.474 |
| Do | 2.23 | 1.473 |
| Do | 2.13 | 1.469 |
| 96% Silica | 2.18 | 1.458 |

An example of a specific embodiment is a choice of "hard lime" glass particles in the above table which have a refractive index of 1.534. A mixture of 45 percent by volume of methylene iodide ($CH_2I_2$) and 55 percent by volume of ethyl alcohol ($CH_3CH_2OH$) provides a fluid medium having substantially the same refractive index as that of the glass and a specific gravity very nearly the same as that of the glass. With the specific gravity of the fluid medium and particles being about equal, the glass particles can float suspended in the fluid medium, requiring only a minimum of occasional agitation. The individual refractive index of methylene iodide is 1.76 and of ethyl alcohol is 1.36. A final adjustment of the resultant refractive index is made easily by adding a small amount of either of the component fluids, which may be made on a drop by drop basis if necessary through bottle neck 39.

In some cases it will be desirable not to have all or perhaps any of the transparent particles spherical in shape, but it will be desirable to have at least some of them nonspherical, such as ellipsoidal, since there is some evidence that the "blobs" in the troposphere do not necessarily have spherical distributions but that many are likely to be nonspherical and probably ellipsoidal.

Since radio-frequency propagation is done at a fixed carrier frequency, this is simulated by choosing a particular wavelength of light. In the example it will be assumed that the sodium D line at 5,893 Angstroms wavelength is chosen. It will be further presumed that the simulated radio-frequency is 1,000 megacycles-per-second which provides a wavelength of 0.3 meter. As stated above, the "blob" radius in the troposphere is about 48 meters in diameter. This provides a diameter of about 160 wavelengths at a frequency of 1,000 megacycles. Glass spherical particles are provided that have diameters proportioned to the 5,893 Angstroms wavelength light energy in the same manner as 48 meter "blobs" are proportioned to the 0.3 meter wavelength of the radio-frequency energy. This provides a glass-particle diameter of about 0.1 millimeter, which is a commercially available size and can be obtained from the Corning Glass Company with their code No. 1710 of "hard lime" glass. Upon mixing the particles in the fluid, a medium is provided which is analogous to the troposphere, in regard to variation of refractive index, which is credited with causing the radio-scattering phenomenon.

A pair of leads 61 connects the photo-cell output to a meter 62, which can be a vacuum-tube voltmeter, to measure the output intensity from cell 51. Lead 61 passes through a light-sealed grommet 63 in box 33.

When photo cell 51 is positioned at zero angle on track 52, and knob 42 is varied to vary $\theta$ from 0° to 180°, a similar situation is provided to that shown in Figure 4 where points RPT lie in a "great-circle" plane of the earth. Thus, rotation of knob 42 varies angle $\theta$, which in Figure 4 is done by varying the "great-circle" distance between points R and T. Varying angle $\phi$ for photo cell 51 along track 52 is similar to varying the angle $\phi$ in Figure 4 which takes the receiver position out of the "great-circle" plane of the earth. Note that the earth's "great-circle" plane is not to be confused with a "great-circle" plane of spherical bottle 32, since beams 23 and 35 are always in the latter type of "great-circle" plane. Thus, the sphere of bottle 32 is not representative of the earth but is only representative of a portion of atmosphere about the intersection point of transmitting and receiving antenna beams.

Two situations arise in regard to the shape of "blobs" being used. The first situation is where the "blobs" are all spherical in shape. The second situation is where the "blobs" are not spherical in shape but might, for example, have elliptical variations.

In the situation where the "blobs" are all spherical in shape, the scattering effect may not be dependent upon the orientation of the "blobs." Then, the same effect is obtained by either of the following cases:

(1) Having a fixed polarization plane as defined by arrows 24 and varying angle $\phi$ by moving photo cell 51 along track 52, or (2) Keeping photo cell 51 fixed at the zero-angle position along track 52 and rotating the plane of polarization by knob 28.

However, each case is somewhat complicated by the polarization control of photo cell 51 due to polarization lens 58 since the reception of maximum energy by photo cell 51 requires realignment of the axis of polarization of lens 58 for each change of either angle $\theta$ or $\phi$. Maximum intensity is received when the polarization axis of lens 58 is parallel to the polarization direction of the beam, such as given by arrows 24. A simplification in either of case (1) or (2) is provided by removing polarization lens 58 so that photo cell 51 always receives maximum energy regardless of polarization shift at the receiver due to varying the angles $\theta$ or $\phi$. Case (2) enables more simple operation than case (1) in that case (2) permits complete control of both angles $\theta$ and $\phi$ to be obtained at knobs 42 and 28 respectively, which are both external to box 33; and thus, case (2) does not require any adjustment within box 33. Accordingly, the labor required in case (2) of opening the box and repositioning photo cell 51 for every new value of angle $\phi$ is eliminated.

In the situation where the "blobs" are nonspherical, the use of case (1) becomes undesirable because of the nonsymmetrical scattering effect which may be caused by some orientations of the nonsymmetrical "blobs." Thus, such scattering effect may be unsymmetrical about a cross-section of the beam in a manner which is dependent upon the orientation of the "blobs," which may be random in many situations. This type of cross-sectional scattering variation is separate from and in addition to the figure-eight type of cross-sectional variation previously explained in connection with the polarization of the beam. Hence, the over-all cross-sectional scattering pattern of the beam is caused by both the plane of polarization and the orientation distribution of the nonspherical particles. With this situation, angle $\phi$ cannot properly be controlled by knob 28 because that would change the over-all cross-sectional beam pattern by changing the relationship between the polarization cross-sectional component intensity and the nonspherical "blob" orientation component cross-sectional intensity, thus injecting a new variable into the system. In experimental situations, it is desirable to maintain the number of variables at a minimum. This variable is eliminated by leaving knob 28 in a fixed position with the illustrated polarization and varying angle $\phi$ by moving photo cell 51 along track 52.

In the nonspherical "blob" situation, simulation of a particular type of "blob" orientation can be provided by connecting together a number of "blobs" with fine black thread or by using a semisolid gelatinous medium to support them in beam 23.

It may be desirable in some cases to have an indication of the direct scattering phenomenon of the light beam. This is made visible by diffraction rings 72 appearing on frosted glass 71 supported across the end of box 33 in alignment with light beam 23. A hinged door 76 with a dull black inner surface is fastened to box 33 adjacent to frosted glass 71 and can be closed over the frosted glass to prevent light from passing into the box when the above-explained operations with angles $\theta$ and $\phi$ are being done.

Although this invention has been described with respect to a particular embodiment thereof, it is not to be so limited as changes and modifications may be made therein which are within the full intended scope of the invention as defined by the appended claims.

I claim:
1. A light-scattering mixture simulating the scattering effect of radio-frequency energy in the atmosphere, comprising a plurality of minute glass particles, a fluid medium supporting said particles in distributed relationship, said fluid medium comprising a solution of methylene iodide ($CH_2I_2$) and ethyl alcohol ($CH_3CH_2OH$), the refractive index of said medium differing from the refractive index of said glass spheres by less than one part-per-thousand.

2. A light-scattering mixture simulating the scattering effect of radio-frequency energy in the atmosphere, comprising a plurality of hard lime glass spherical particles having a diameter of the order of 0.1 millimeter, and a fluid medium supporting said particles in distributed relationship, said fluid medium comprised of a solution of about 45 percent by volume of methylene iodide and about 55 percent by volume of ethyl alcohol.

3. Means for simulating tropospheric radio wave scattering by means of light-energy scattering, comprising a spherical transparent container, a light-scattering mixture contained within said container, said mixture comprising a plurality of hard lime glass spherical particles having a diameter of the order of 0.1 millimeter, and a fluid medium supporting said particles in distributed relationship, said fluid medium comprising a solution of about 45 percent by volume of methylene iodide and about 55 percent by volume of ethyl alcohol to provide a refractive index for said fluid medium within the range of $10^{-3}$ to $10^{-6}$ of the refractive index of said particles from the refractive index of said particles, light-generating means providing a polarized collimated beam diametrically through said container, said beam having a predetermined wavelength, a box having a dull black inner surface surrounding said container, a supporting track fixed to the outer surface of said container in a direction transverse to said beam, a photoelectric cell supported on said track and positionable along said track, a meter positioned external to said box and connected to said photoelectric cell to indicate its output, angle indicating and adjusting means external to said box coupled to said spherical container for rotating it to and indicating a required angular position of said photoelectric cell.

4. An apparatus such as defined in claim 3 wherein said transparent container is supported on its bottom side by rotatable bearings, and has a neck portion protruding through a light-sealed opening in an upper portion of said box, a handle and pointer fixed to said protruding neck portion of said bottle, dial means fixed to said box co-operating with said handle and pointer to indicate a first angular position of said photoelectric cell with respect to said beam in regard to one degree of movement, and the angular position along said supporting track being calibrated to indicate the second angular position of said photoelectric cell with respect to said beam.

References Cited in the file of this patent

UNITED STATES PATENTS

| | | |
|---|---|---|
| 1,648,369 | Svedberg et al. | Nov. 8, 1927 |
| 2,280,993 | Barnes | Apr. 28, 1942 |
| 2,352,072 | Bond | June 20, 1944 |
| 2,590,827 | Stamm et al. | Mar. 25, 1952 |
| 2,718,071 | Rorholt | Sept. 20, 1955 |
| 2,816,479 | Sloan | Dec. 17, 1957 |